United States Patent
Nageli

(10) Patent No.: US 7,043,262 B2
(45) Date of Patent: *May 9, 2006

(54) TWO-WAY PAGER AND METHOD FOR COMMUNICATING PRESET MESSAGES OVER THE GLOBAL SYSTEM FOR MOBILE COMMUNICATIONS (GSM/GPRS) NETWORK

(76) Inventor: Hans Peter Nageli, Bachweg 9, Affoltern a./A. (CH) 8910

( * ) Notice: Subject to any disclaimer, the term of this patent is extended or adjusted under 35 U.S.C. 154(b) by 0 days.

This patent is subject to a terminal disclaimer.

(21) Appl. No.: 10/845,623

(22) Filed: May 3, 2004

(65) Prior Publication Data

US 2004/0207513 A1    Oct. 21, 2004

Related U.S. Application Data

(63) Continuation-in-part of application No. 09/262,423, filed on Mar. 4, 1999, now Pat. No. 6,731,942.

(60) Provisional application No. 60/077,080, filed on Mar. 6, 1998.

(51) Int. Cl.
*H04Q 7/20* (2006.01)

(52) U.S. Cl. .................. 455/458; 455/466; 340/7.23

(58) Field of Classification Search .............. 340/7.21, 340/7.22, 7.23, 7.2, 7.43, 7.53, 7.59; 455/458, 455/459, 460, 466, 426.1, 3.05, 2.01, 414.1–414.4, 455/566–567, 90.2, 575.1

See application file for complete search history.

(56) References Cited

U.S. PATENT DOCUMENTS

| 4,644,351 | A | 2/1987 | Zabarsky et al. | 340/7.21 |
| 4,940,963 | A | 7/1990 | Gutman et al. | 340/7.22 |
| 5,600,703 | A | 2/1997 | Dang et al. | 340/7.22 |
| 5,625,885 | A | 4/1997 | Nakazawa et al. | 340/7.22 |

(Continued)

FOREIGN PATENT DOCUMENTS

DE    197 21 127 A1    12/1997

(Continued)

OTHER PUBLICATIONS

Melanchuck, et al., :CDPD and Emerging Digital Cellular Systems; XP000628458; pp. 2-8 (1996).

(Continued)

*Primary Examiner*—Eliseo Ramos-Feliciano
(74) *Attorney, Agent, or Firm*—George J. Thomas; James W. Kayden; Scott A. Horstemeyer

(57) ABSTRACT

The present invention provides a communication system for transmitting messages from one or more dispatcher stations to and from one or more stand-alone, two-way pagers via a radio frequency communication channel, namely, the short message service (SMS) of the Global System for Mobile Communications (GSM/GPRS) cellular telephone network. The paging system of the present invention utilizes a communications protocol which allows a dispatcher station and a pager of the paging system to communicate over the GSM/GPRS network in a predetermined manner. When the dispatcher station sends a message to a pager of the present invention, the message may contain steering codes which inform the pager of the manner in which the message is to be treated. For example, if the message is time-critical, the pager is notified by the steering code that a response to the message must be transmitted within a predetermined time integral. If the pager does not transmit a response within the predetermined time interval, the pager is not allowed to respond to the message. The steering codes may also require that the user can respond with a preprogrammed answer which has been previously stored in the memory of the pager. The two-way pager allows the central station to determine the geographical location of the pager.

35 Claims, 8 Drawing Sheets

U.S. PATENT DOCUMENTS 5,678,191 A * 10/1997 Eaton et al. ................ 340/7.22
5,930,479 A     7/1999 Hall ........................... 709/238
5,959,543 A *  9/1999 LaPorta et al. ............ 340/7.23

FOREIGN PATENT DOCUMENTS

EP        0 825 788 A2    2/1998

OTHER PUBLICATIONS

OAS Weekly Digest; Issue #14; Oct. 16, 1995; by OMROM Advanced Systems, Inc.

SkyTel; Products; Services & Software Two Paging Service Brochure 1997.

Motorola; TangoTM Two-Way Pager; Brochure Feb. 3, 1998.

Motorola; PagewriterTM Press Release; Feb. 27, 1998.

Two Way Remote Messaging; Subalco Systems, Feb. 3, 1998.

Scanco Palm Page; The Power of Intelligent Communication; Feb. 3, 1998.

Making The Call With Two-Way Paging; by Peter Rysavy; Network Computing Online; Jan. 10, 1997.

Two-Way Paging Networks; by Todd Spangler; PC Magazine Online; Nov. 21, 1997.

Anneli Ortqvist Erme's Role In Europe; Swedish Telecom Radio; pp. 120-122.

* cited by examiner

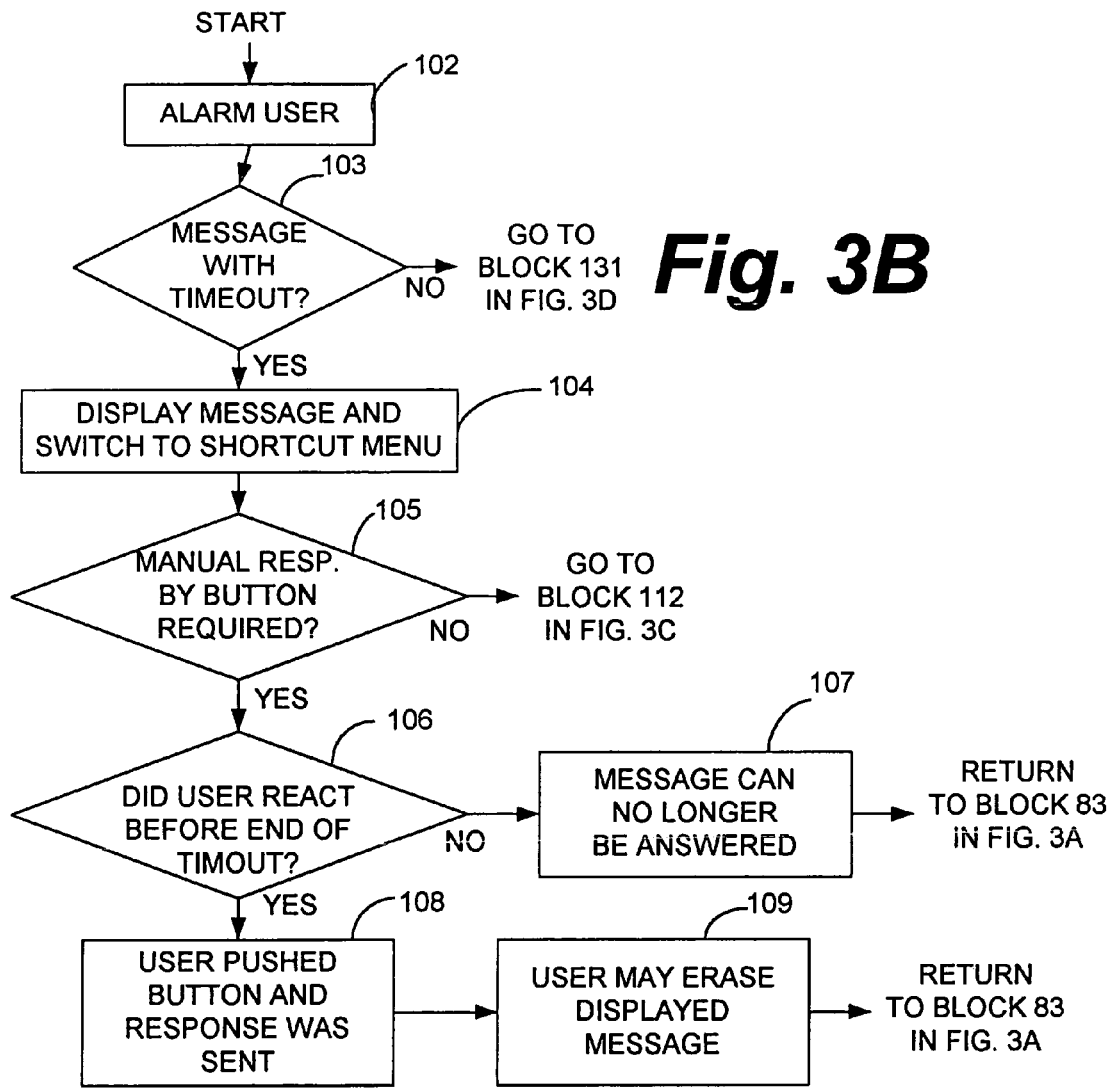

TWO-WAY PAGER AND METHOD FOR COMMUNICATING PRESET MESSAGES OVER THE GLOBAL SYSTEM FOR MOBILE COMMUNICATIONS (GSM/GPRS) NETWORK

CROSS-REFERENCE TO RELATED APPLICATION

This application is a continuation-in-part of U.S. utility application entitled, "A TWO-WAY PAGER FOR PROVIDING TWO-WAY COMMUNICATION OF ALPHANUMERIC MESSAGES OVER THE GLOBAL SYSTEM FOR MOBIL COMMUNICATIONS (GSM/GPRS/GPRS) NETWORK" having Ser. No. 09/262,423, filed Mar. 4, 1999, U.S. Pat. No. 6,731,942, issued May 4, 2004, which is entirely incorporated herein by reference which in turn claims priority to U.S. provisional application entitled, "Mobile Communications System Having Pagers For Providing Two-Way Short Alphanumeric Messages Between Pagers Via The GSM Network," having Ser. No. 60/077,080, filed Mar. 6, 1998, which is entirely incorporated herein by reference.

BACKGROUND OF THE INVENTION

1. Technical Field of the Invention

This invention relates in general to a mobile communications system which has pagers and base stations providing two-way communication of alphanumeric messages between the pagers and the base stations. More particularly, these messages are communicated via the Global System for Mobile Communications (GSM/GPRS) network which has been set up on a world wide basis. It is specifically designed for the pager to send preset, or canned, responses to a central station which are useful in coordinating personnel responding to events, such as emergencies.

2. Description of the Prior Art

Simple paging systems are comprised of small analogue radio receivers (pagers) and one or more transmitters (base stations). The base station in these systems transmits a series of tones which represent an address code and the pagers in the system evaluate the tones. At least one pager in the network detects the tone sequence as its own code and alarms the user of the pager with a beep or vibration that the user is being called.

Paging systems have progressed over the years in both frequency and extent of usage as well as complexity, Some pagers now have subminiature radio receivers, which are capable of reproducing a voice message which has been broadcast over the network by a transmitter. Only those pagers whose address codes have been transmitted over the network will open their audio paths to receive the transmitted voice message.

Some of the more recent pagers are equipped with a numeric or alphanumeric display. These pagers are capable of displaying a message sent by transmitters using a digital code which contains the address of a specific pager, or group of pagers, and the text of the message being sent. These paging systems may use a protocol such as the Post Office Code Standardization Advisory Group (POCSAG) or Golay Sequential Code (GSC). These protocols utilize well known error detection and error correction techniques and are, therefore, tolerant to bit errors occurring during transmission, provided the errors are not too numerous in any one word.

All of the paging systems described above are strictly one-way. There is no confirmation to the sender that a message has actually reached the pager, nor does the user have any means of sending an answer via his pager.

To remedy this limitation, pagers have been developed which allow two-way communication and which have individual transmission capability. When a pager of this type is called by a base station, the pager transmits its ID code to the base station which is an affirmative response that the pager has received the call.

A conventional pager which permits two-way data communication requires more electric power than can be provided by the battery of a conventional pager. In order to solve this problem, a dedicated network of repeaters are used to send the pager's ID and message to the sending base station. A large number of repeaters are necessary for a two-way paging system to cover a large geographical area (e.g., a state or an entire country). This is a very expensive outlay needed to obtain a two-way data communication channel. In addition, a multi-repeater setup requires many different radio frequencies which are becoming more difficult to obtain from the FCC. Additional gateways are required if the communication system also accesses fax machines, the Internet or other alphanumeric devices. The dedicated two-way paging systems are ideal for a single-repeater configuration which covers a limited area (e.g., a single building or hospital).

Thus, what is needed is a two-way paging system that can be used throughout an entire country or internationally which does not require a large number of expensive repeaters. In addition, there is an increasing need to incorporate gateways to other communication networks within the paging system.

The Global System for Mobile Communications (GSM/GPRS) standard has been widely adopted in Europe and is now under consideration in several other countries outside of Europe. One of the primary goals of the GSM/GPRS standard is to enable users to move across national boundaries while still being able to communicate. Each country independently operates its own public land mobile network (PLMN) and the coverage of the PLMN is commercially confined to the borders of the country in which it is implemented. Radio coverage may overlap at national boundaries and each country may have several competing PLMNs.

GPRS (General Packet Radio Service) is a data service that allows information to be sent and received across a mobile telephone network. It supplements today's Circuit Switched Data and Short Message Service. Theoretical maximum speeds of up to 171.2 kilobits per second (kbps) are achievable with GPRS using all eight timeslots at the same time. This is about three times as fast as the data transmission speeds possible over today's fixed telecommunications networks and ten times as fast as current Circuit Switched Data services on GSM networks. By allowing information to be transmitted more quickly, immediately and efficiently across the mobile network, GPRS may be a relatively less costly mobile data service compared to SMS and Circuit Switched Data. GPRS facilitates instant connections whereby information can be sent or received immediately as the need arises, subject to radio coverage.

When a GSM/GPRS customer subscribes to the GSM/GPRS system, the subscriber normally subscribes to a single PLMN, which is commonly referred to as the home-PLMN. The subscriber's terminal, which is commonly referred to as the mobile station (MS), is typically thought of as having two principle components, namely, a first component relating to hardware and software for the radio interface and a second component relating to the subscriber identification information, which corresponds to the subscriber identity module (SIM). The SIM component can be removed from the subscriber's mobile station and is typically much smaller than a credit card. The SIM is assigned a unique identity within the GSM/GPRS system, which is commonly referred to as the international mobile subscriber identity (IMSI). The IMSI is an identifier which is internal to the GSM/GPRS system and which is utilized by the GSM/GPRS system to identify the mobile station. A second identifier, commonly referred to as the temporary mobile station identity (TMSI), is assigned to each mobile station when it enters a new registration area and is valid only within that particular registration area. These identifiers should not be confused with the telephone number assigned to the mobile station. The TMSI and IMSI identifiers are utilized by the GSM/GPRS system to track the mobile station within a registration area and as it moves from one registration area into another registration area of the GSM/GPRS network.

Currently, a stand-alone, two-way paging system which utilizes the GSM/GPRS network does not exist. The GSM/GPRS standard provides a short message service (SMS), which is suitable for alphanumeric paging SMS is now widely utilized. The SMS provides for communication of alphanumeric messages at over GSM/GPRS. However, in order for subscribers to have access to any of the GSM/GPRS services, including SMS, telephone companies require subscribers to pay cellular telephone rates. Although some companies provide cellular telephones with paging-type circuitry which can be used to transmit alphanumeric messages over the GSM/GPRS network, since GSM/GPRS subscribers are required to pay cellular telephone rates, GSM/GPRS subscribers typically communicate by voice over their cellular telephones rather than by sending alphanumeric messages over the SMS. Therefore, there has been no motivation or desire to provide stand-alone pagers for the GSM/GPRS network.

In areas in which the number of available frequency bands is very limited, the typical pagers described above and the systems in which they operate are unsuitable due to the large number of frequency bands needed for their operation. For example, in small countries, such as Switzerland, these typical paging systems are unsuitable because the number of frequency bands required for their use is not available. It would be desirable to provide a two-way paging system which utilizes the currently under-utilized SMS bandwidth and which does not require the subscriber to have a cellular telephone. One of the advantages of such a system is that it would allow government emergency response agencies, such as the fire department, to have two-way communication over relatively simple paging devices and thus would eliminate the need to purchase cellular telephones for this purpose, which generally are much more expensive than pagers.

Accordingly, a need exists for a stand-alone, two-way pager which is capable of providing two-way communication over the GSM/GPRS network.

SUMMARY OF THE INVENTION

The present invention provides a communication system for transmitting messages from one or more dispatcher stations to and from one or more stand-alone, two-way pagers via radio frequency communication channel, namely, the short message service (SMS) of the Global System for Mobile Communications (GSM/GPRS) cellular telephone network.

The paging system of the present invention utilizes a communications protocol which allows a dispatcher station and a pager of the paging system to communicate over the GSM/GPRS network in a predetermined manner. When the dispatcher station sends a message to a pager of the present invention, the message may contain steering codes which inform the pager of the manner in which the message is to be treated. For example, if the message is time-critical, the pager is notified by the steering code that a response to the message must be transmitted within a predetermined time integral. If the pager does not transmit a response within the predetermined time interval, the pager is not allowed to respond to the message.

The steering codes may also indicate whether or not the user of the pager must respond with a preprogrammed answer. If the steering code indicates that the user must respond with a preprogrammed answer which has been previously stored in the memory of the pager, the only response the user is allowed to transmit is one of the preprogrammed answers. Otherwise, the user may transmit a different type of response, such as, for example, a message which the user types in using the alphanumeric keypad of the pager.

In accordance with a first embodiment of the present invention, the pager comprises only a few keys which allow the user to select from a limited number of preprogrammed answers to be sent to the dispatcher station in response to a message received by the pager. In accordance with a second embodiment of the present invention, the pager comprises a full alphanumeric keypad which allows the user to send messages which the user types in using the full alphanumeric keypad. The pager of the second embodiment may also be capable of sending preprogrammed answers.

The pager of the first embodiment of the present invention is especially useful in controlling and directing emergency personnel in an emergency situation, such as a fire, police or military situation. These personnel can be controlled from a central location with a paging system of this invention. A pager has a preset menu of messages (i.e. canned messages) from which the user of the pager can select. A steering code prevents the user from selecting any other message or creating his or her own message. This pager preferably has six keys to handle all the messages the user of the pager is permitted to send. The steering code can be set so that the user of the pager must respond within a certain set time or he or she will not be able to respond at all. The pager of this invention preferably has a feature for automatic notification to the central location that the message has been received. The user is able to acknowledge to the central location that he or she has read the message. A feature can be provided where the user scrolls down to the end of the message on the display, at which time a automatic message is sent which indicates that the user has scrolled through the message. A higher level of certainty is obtained if the user is required to affirmatively acknowledge that he or she has read the message.

The pager is also provided with a button to indicate that he or she will comply with a displayed message.

The pager may have certain other features, such as an accelerometer to indicate to the central location that the user is immobilized.

The pager may also have a low-battery detector so that a message can be sent out to the central location that the pager has a low-battery.

As a further example of the control over the pager by the central location, a steering code can be programmed from a central location to shut off the pager, erase the memory, or prohibit the pager from receiving or sending any messages over the network. This is an important feature because the emergency situation in a fire, or terrorist action, or military action can be very fluid and volatile.

At present it is not possible to determine the location of a one-way pager because it does not send out any messages from which its location can be computed by triangulation algorithms as in the case of cellular phones. Since this two-way pager is designed to send out messages either automatically or by the user pushing one of the buttons on the pager that sends the message, the central location can compute the location of the pager in the same way that the location of a cellular phone can be located. The central location can use the steering code to require a pager or all the pagers under its control to send a message so that all of the pagers can be located geographically.

These six keys of the pager can be programmed to perform multiple functions. This pager is preferable equipped so that the pager can be secured and only locked by pressing a set combination of the keys. This is very important in maintaining the security in an emergency situation.

The enhanced pager of this invention can be constructed with only four buttons. By combining some functions a simplified enhanced pager can be constructed with three buttons.

Other features and advantages of the present invention will become apparent from the following description, drawings and claims.

BRIEF DESCRIPTION OF THE DRAWINGS

FIGS. 3A–3E together form a flow chart which demonstrates the method of the present invention in accordance with the preferred embodiment for utilizing the two-way pager of the present invention to communicate over the GSM/GPRS network.

DETAILED DESCRIPTION OF THE INVENTION

Figure 1:
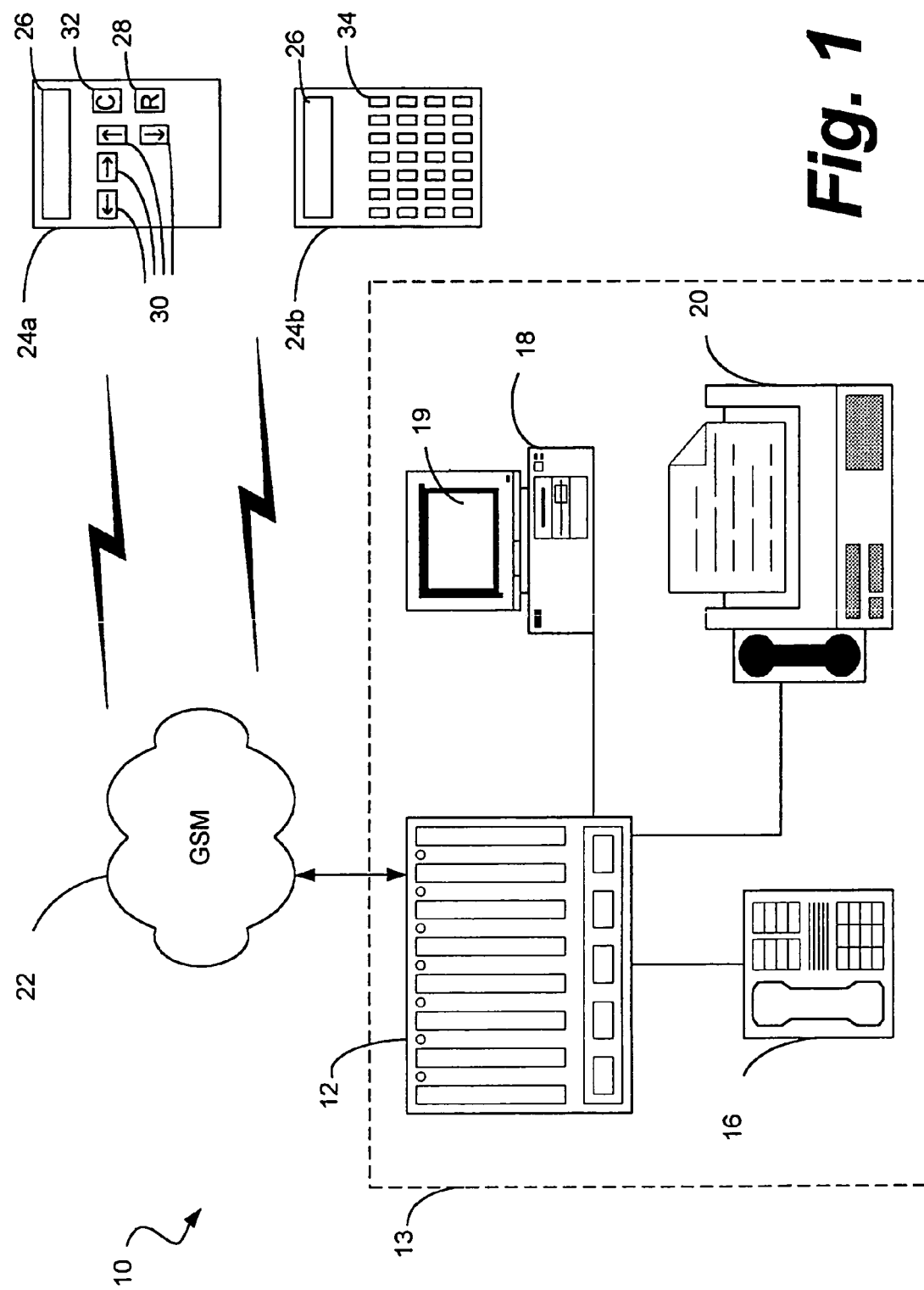
FIG. 1 is a block diagram of a paging system in accordance with the present invention which has the capability of communicating over the GSM/GPRS network.

FIG. 1 illustrates the paging system of the present invention which utilizes the Short Message Service (SMS) of the Global System for Mobile Communications (GSM/GPRS). The GSM/GPRS system was established for digital cellular phone service. The SMS utilizes a transmission system that does not interfere with the GSM/GPRS cellular phone service. Because the GSM/GPRS service has many more receivers than it has transmitters, it has greater capability for receiving relatively low-powered page-back messages than paging networks that have only a few receivers which are only capable of receiving high-powered messages.

The system 10 includes a dispatcher station 13 which comprises a paging controller terminal 12 which may receive, via one or more input/output (I/O) ports, incoming telephone calls from a standard telephone handset 16 or incoming data from a computer 18 or a facsimile machine 20. Other types of end user devices (not shown) may also be connected to the controller terminal 12, as will be understood by those skilled in the art. The controller terminal 12 also outputs information to the end user devices 16, 18 and 20 via the I/O ports of the controller terminal.

The controller terminal 12 transmits paging requests to and receives paging requests from the GSM/GPRS network 22. When a paging request is received by the controller terminal 12, the controller terminal processes the paging requests and obtains the appropriate address of the device being paged from a memory device, which may be located within the controller terminal 12 or at some other suitable location in communication with the controller terminal 12, such as within the desk-top computer 18. The controller terminal 12 then activates a GSM/GPRS paging transceiver (not shown) located within the GSM/GPRS network 22 which, in turn, broadcasts the intended paging call to one or more pagers of the system 10.

In addition to the controller terminal 12 processing paging requests generated by one or more pagers, such as pagers 24A and 24B, the controller terminal 12 and end user devices 16, 18 and 20 together comprise a dispatcher station 13 from which paging requests may be generated. For example, a person acting as a dispatcher may dispatch paging requests and other messages by utilizing computer 18 to generate paging messages. The computer 18 is programmed to generate messages which are formatted in accordance with a predetermined format. The controller terminal 12 receives these messages and transmits these messages to the GSM/GPRS network 22 in a manner consistent with the GSM/GPRS signaling protocol. When an incoming message is received by the controller terminal 12, the controller terminal 12 processes the message into a predetermined format and transmits the processed message to one of the end user devices 16, 18 and 20. The computer 18, which may be, for example, a personal computer (PC), is programmed to process the received message and to display information to the dispatcher on the display monitor 19 of the computer 18. The manner in which the computer 18 performs these tasks will be discussed in detail below with respect to FIGS. 4A–4E.

One pager 24a of the present invention comprises a keyboard of only a few keys 28, 30 and 32, e.g., six (6) keys, to allow a user to send back a preprogrammed answer by actuating a particular key. Alternatively, one pager 24b of the present invention comprises a full keyboard 34 on which the user may type full text messages. In either case, the pager may comprise a display 26 for displaying alphanumeric messages to the user.

With respect to pager 24a, each key 28, 30 and 32 has a particular meaning associated with it which is known by the user. The pager 24a is programmed to generate and transmit a particular answer in response to a particular key being actuated. This feature of the present invention is very useful in emergency situations because it forces the user to respond in one or more predetermined manners, which are anticipated by the computer 18 of the dispatcher station 13. The advantages of this feature of the present invention will become even more apparent from the discussion of FIGS. 3A–3E. However, it will be understood by those skilled in the art that the system 10 may be implemented with different types of pagers other than, or in addition to, those shown in FIG. 1.

The GSM/GPRS signaling protocol and the manner in which information is communicated over the GSM/GPRS network 22 are well known in the art. Implementation of the present invention does not require that the GSM/GPRS network 22 be adapted or modified in any way. Therefore, a detailed discussion of the GSM/GPRS network 22 and the manner in which information is communicated therein will not be provided herein.

The pager 24a shown in FIG. 1 is the preferred form for the pager of the present invention due to the suitability of this type of pager to its use by personnel working in emergency-type occupations. However, it should be noted that the present invention is not limited to any particular type of pager. As stated above, the pager 24a shown in FIG. 1 has six keys 28, 30 and 32 and a memory element (not shown) that contains a plurality of preprogrammed messages. The alphanumeric display 26 may be a liquid crystal display (LCD) or a light emitting diode (LED) display. Incoming messages are displayed on the alphanumeric display 26 when received and are automatically stored in the memory element.

If a new message arrives at the pager 24a, the user can store the message in memory for future use by manipulating the arrow keys 30. For example, a message can be stored in the memory element by moving the arrow key up to its maximum position and then by clicking the command key 32. Conversely, the message can be discarded by moving the down arrow key to its lowest position and by clicking the command key 32. Because of the limited memory of the pager, preferably the messages will not exceed 160 characters in length, although those skilled in the art will understand that this is not a limitation of the invention but is one of economy and practicality.

In accordance with the preferred embodiment, the six key preprogrammed pager 24a is equipped with an automatic acknowledge-back feature which can be suppressed, when suitable. Because the automatic acknowledge feature provides no assurance to the sender of the page that the page has actually been read, the pager is provided with a screen display request key 28. By pressing this key, the user acknowledges that he or she has read the message on the alphanumeric display 26. Whether or not the user must acknowledge that he or she has read the message and/or whether or not the pager must automatically acknowledge receipt of the message will be dictated by the steering codes transmitted with the messages, as discussed below with respect to FIGS. 3A–3E.

The pager 24a has sufficient memory to contain the desired number of preprogrammed messages. These messages can be displayed in sequence in full text or by number and short abbreviation on the alphanumeric display 26 by pushing the respective arrow button 30. The pager 24a is provided with a command button 32 for sending messages. The preprogrammed answers stored in the memory element of the pager can be loaded into the memory element in any desired manner. For example, the answers may be downloaded into the memory element from a PC or programmed into the unit with a special function code by wireless transmission, as will be understood by those skilled in the art. This special function code prevents the user from modifying the preprogrammed message on the pager itself without the use of a PC and/or the special function code.

The pagers of the present invention may have the same preprogrammed answers so that they send back a simple response for the particular message rather than repeat the entire message. As stated above, the pager 24b comprises an alphanumeric keypad 34 which enables the user to type a full-text message. The pager 24b may also be equipped to enable the user to select preprogrammed messages in the manner discussed above for the pager 24a. In addition to the alphanumeric keys, the pager 24b may comprise keys similar to those comprised by the pager 24a to allow the user to respond either by sending preprogrammed messages or by sending a message which the user types.

The pagers of the system 10 of the present invention can be designed for specific purposes and organizations such as, for example, for rescue and security efforts and organizations. In emergency situations, the dispatcher (not shown) may only want to receive one of a limited number of predetermined responses from the party being paged. For example, the dispatcher may only want the paged party to respond with a "Yes" or "No" answer. For example, if a building is on fire, the fire department dispatcher may only want to know if firefighters can respond immediately. It may be deemed unsuitable for the dispatcher to receive an elaborate message, such as "I can't respond now because I am at another fire location, but I will respond as soon as possible." The dispatcher may only want to know who can respond immediately. Therefore, using preprogrammed messages limits the type of response which can be made by the paged party and also allows the paged party to respond with greater speed than if the paged party had to type a message.

This feature of the present invention also limits the amount of information that must be processed by the dispatcher and thus reduces the number of decisions that must be made by the dispatcher. Therefore, in many cases it is preferable to require a paged party to respond with only a limited number of preprogrammed messages. Therefore, the type of pager utilized may well depend on the purpose for which it will be used. FIGS. 3A–3E together comprise a flow chart which illustrates the method of the present invention for communicating information between a pager, such as pager 24a, and a dispatcher station, such as the dispatcher station 13 shown in FIG. 1. This method equally applies to the pager 24b, as will be understood by those skilled in the art.

Figure 2:
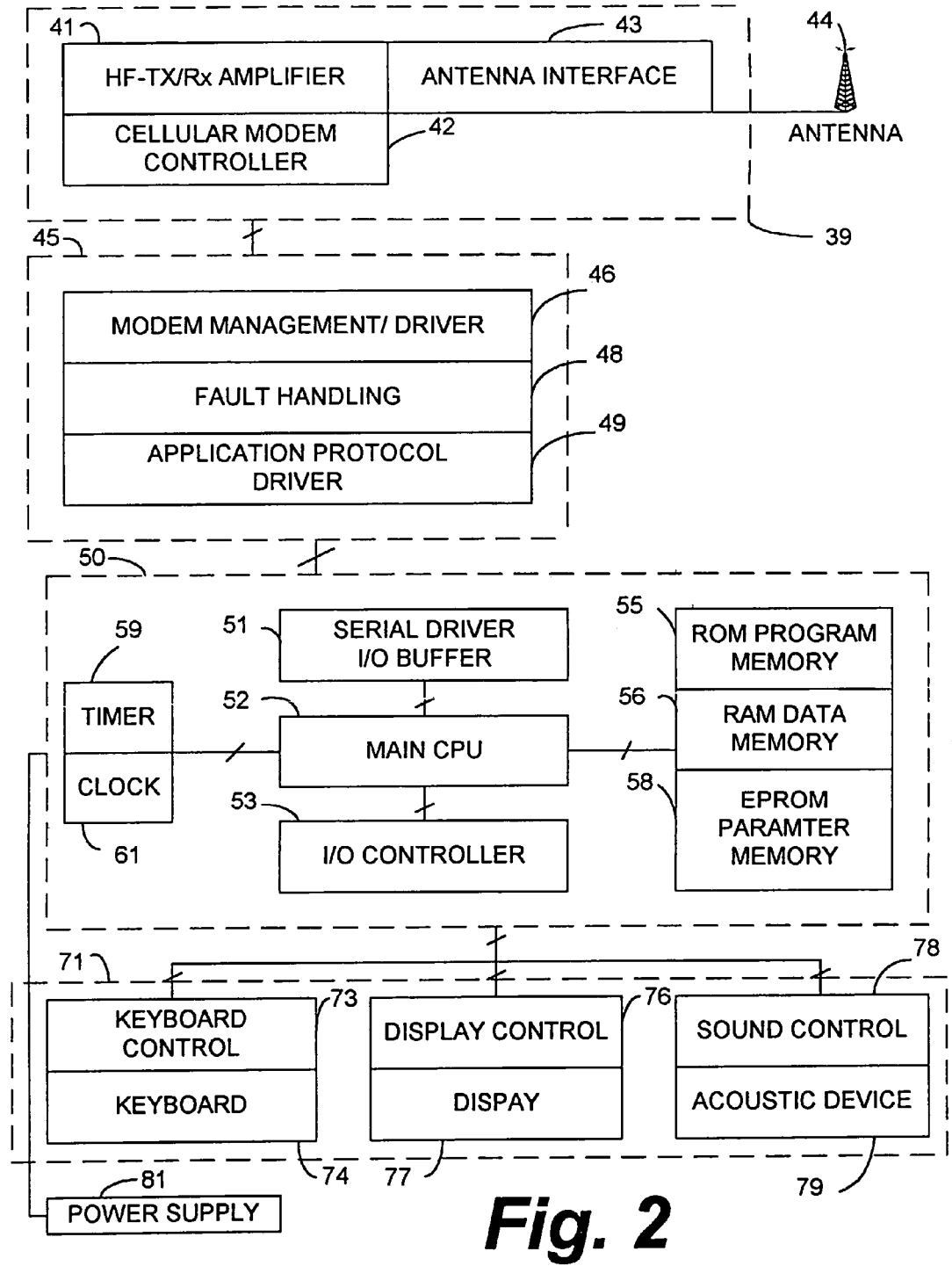
FIG. 2 is a block diagram of electrical components of the pager of the present invention in accordance with the preferred embodiment.

Prior to discussing the method of the present invention illustrated in FIGS. 3A–3E, the internal components of the pager of the present invention will be described in detail. FIG. 2 is a block diagram of the components of the pager of the present invention in accordance with the preferred embodiment. It should be noted that these components preferably are common to both of the pagers 24a and 24b shown in FIG. 1. The pager of the present invention comprises a front-end component 39, which preferably is an off-the-shelf item designed to communicate with the GSM/GPRS network 22. This component may be identical to commercially-avoidable front-end components for cellular telephones which are designed to communicate over the GSM/GPRS network.

The front-end component 39 is connected to an antenna 44 which facilitates reception and transmission of signals over the GSM/GPRS network. The antenna 44 may also be an off-the-shelf component, as will be understood by those skilled in the art. The front-end component comprises an antenna interface 43 which interfaces the other components of the front-end component 39 with the antenna 44. The front-end component 39 comprises an HF-TX/RX receiver/transmitter 41 which is similar to a two-way radio for GSM/GPRS signals. This is also a common element found in off-the-shelf front-end components which communicate over the GSM/GPRS network. The front-end component 39 comprises a cellular modem controller 42 which interfaces the communications driver 45 of the pager with the front-end component 39. The cellular modem controller 42 typically is a combination of software and hardware which function together to provide a parallel data stream to the communication driver 45.

The communication driver 45 formats the data to be transmitted by the pager over the GSM/GPRS network 22 into a format which is suitable for use by the front-end component 39. The communication driver 45 also receives information from the front-end component 39 which is in the GSM/GPRS format and converts the information into a format which is suitable for use with the data processing module 50 of the pager. The communication driver 45 comprises various software modules for performing these tasks. A modem management/driver module 46 functions as the interface between the front-end component 39 and the fault handling module 48 of the communication driver 45. The fault handling module 48 performs functions such as level shifting, level controlling and error correction. An application protocol driver 49 provides an interface between the communication driver 45 and the data processing module 50 of the pager. Since the GSM/GPRS standard is well known to those in the industry, the manner in which the communication driver 45 is designed and implemented to operate in accordance with the GSM/GPRS standard will be understood by those skilled in the art. Therefore, a detailed discussion of the various components of the communication driver 45 and the manner in which they perform their tasks to comply with the GSM/GPRS standard will not be provided herein in the interest of brevity.

The data processing module 50 also may utilize off-the-shelf components, but functions in a manner which is unique to the pager of the present invention. The data processing module 50 comprises a main central processing unit (CPU) 52, which performs the functions of the present invention relating to the identification of messages received by the front-end component 39, the processing of those messages, and the generation of responses to those messages which are to be transmitted over the GSM/GPRS network 22. Therefore, the CPU 52 performs the pager functions shown in FIGS. 3A–3E. The data processing component 50 of the pager comprises a timer 59/clock 61 component which controls the necessary timing functions of the CPU 52. The timer 59/clock 61 component can be performed in either software or hardware, as will be understood by those skilled in the art.

The data processing component 50 preferably is powered by a battery power supply 81 to enable the pager to be mobile. A serial driver I/O buffer 51 interfaces the CPU 52 with the communication driver component 45. An I/O controller 53 provides an interface between the user interface 71 and the main CPU 52 of the data processing module 50. The code utilized by the main CPU to perform its fundamental functions is stored in the ROM program memory 55. The code utilized by the main CPU 52 to perform the functions illustrated in 3A–3E is stored in the RAM data memory 56. Parameters utilized by CPU 52 when executing the code stored in RAM data memory 56 are stored in a parameter memory 58. These parameters may be parameters which are downloaded by the dispatcher station 13 to the pager to enable the parameters to be varied.

The user interface 71 comprises a keyboard 74, a display device 77 and an acoustic device 79. The keyboard 74 interfaces to the data processing component 50 via a keyboard control 73, which functions as a software driver for the keyboard 74. similarly, the display 77 interfaces to the data processing component 50 via a display control module 76, which functions as a software driver for the display 77. The acoustic device 79 interfaces with the data processing module 50 via a sound control module 78, which functions as a software driver for the acoustic device 79. The acoustic device 79 notifies the user of the pager that an incoming message has been received by the pager. Other types of notification devices may be used for this purpose, such as, for example, an audio device which notifies the user that an incoming message is being received by the pager by causing the pager to produce an audio sound. The display 77 preferably is an alphanumeric display, as discussed above with respect to FIG. 1. The keyboard 74 may be the six-key keyboard of pager 24a shown in FIG. 1 or it may be a full alphanumeric keyboard of the pager 24b shown in FIG. 1. The drivers 73, 76 and 78 and the software modules 46, 48 and 49 preferably are executed by CPU 52. However, those skilled in the art will understand that dedicated hardware may be utilized for performing any or all of these functions.

Figure 3A:
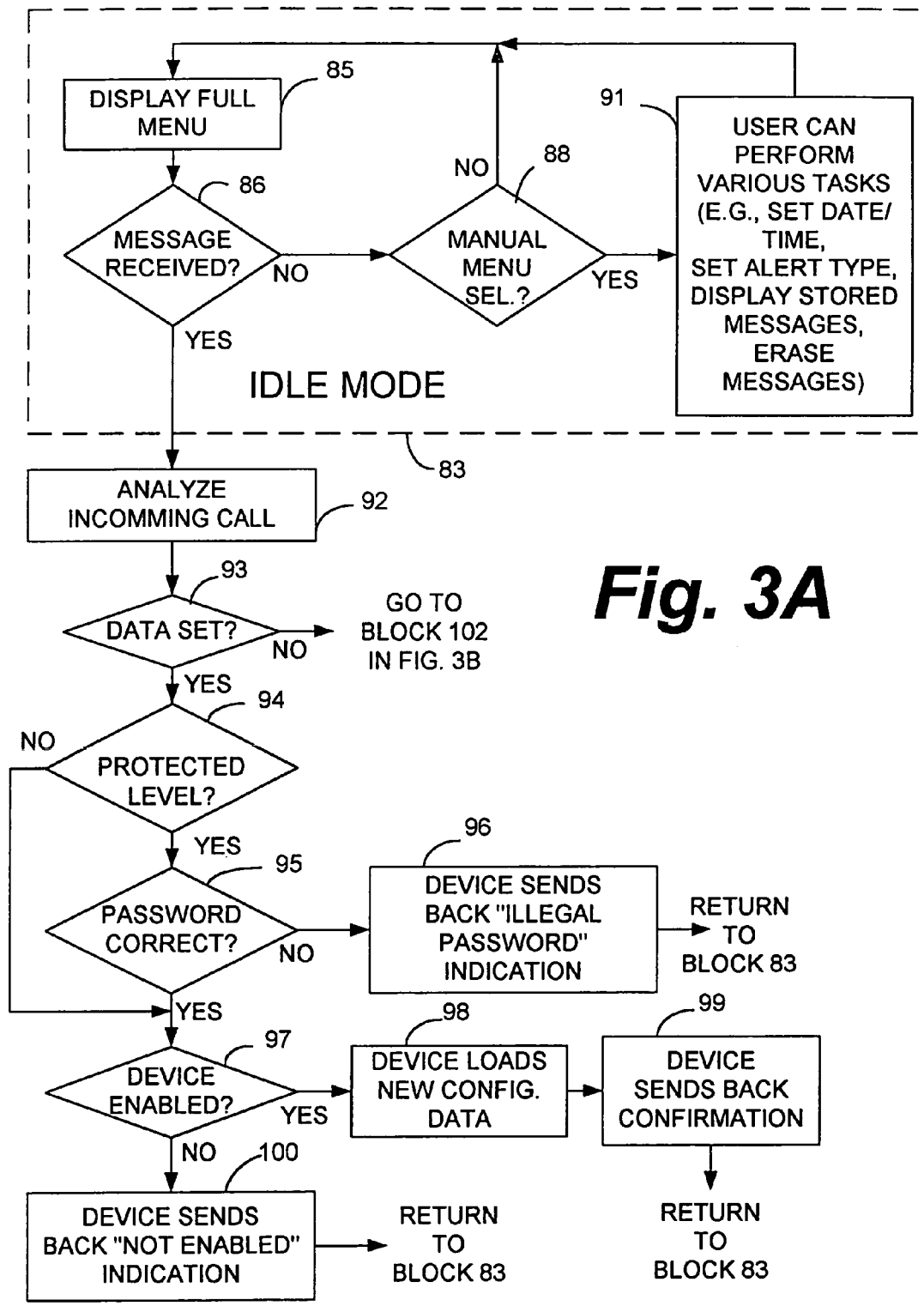

The method of the present invention for providing two-way communications between a pager and a dispatching station will now be described with respect to FIGS. 3A–3E. As stated above, the pager of the present invention comprises a central processing unit 52 which executes code which enables the pager to communicate with the GSM/GPRS network 22. FIGS. 3A–3E demonstrate the preferred communications protocol for allowing the pager to receive information from and transmit information to the GSM/GPRS network 22. The messages received by the pager from the GSM/GPRS network 22 originate at the dispatcher station 13. The computer 18 located at the dispatcher station 13 is programmed with code which is consistent with the code being executed by the central processing unit 52 of the pager to enable the pager and the dispatcher station 13 to communicate over the GSM/GPRS network 22 in a predetermined manner. As shown in FIG. 3A, when no message is being received by the pager, the pager is in the idle mode and performs the functions represented by the blocks contained within the dashed box 83. In the idle mode, the pager communicates with the GSM/GPRS network 22 in accordance with the GSM/GPRS standard to enable the GSM/GPRS network 22 to track and identify the pager. When a message is not being received by the pager, as indicated by block 86, the pager may display a menu which allows the user to manually select from a plurality of tasks to be performed by the pager. Therefore, if the user selects the manual menu selection button, a determination is made at block 88 that the manual menu selection button has been selected and the display of the pager displays various options to the user to allow the user to select a task to be performed. These tasks, which are shown in block 91, may include, for example, setting the date and time, setting the type of alert which the user wants to be used by the pager to alert the user that a message has been received, displaying stored messages to the user on the display, erasing previously stored messages, etc. If the manual menu selection button has not been selected, the modem displays the default full menu to the user, as indicated by block 85.

When a message is received by the pager, as indicated by block 86, the pager analyzes the incoming call, as indicated by block 92, to determine the type of message that has been received. Some messages transmitted by the GSM/GPRS network 22 to the pager include data which is to be used by the pager to configure the pager. Other messages comprise information which is to be displayed to the user. If a determination is made at block 93 that the message received includes a data set, the CPU 52 determines that the pager is to be configured using the received information. The CPU 52 then determines whether or not the message corresponds to a protected level, as indicated by block 94. This step ensures that the GSM/GPRS network 22 is authorized to configure the pager. If a determination is made at block 94 that the incoming message corresponds to a protected level, then the message must include the correct password, which is known to the CPU 52, before the CPU 52 will configure the pager. If a determination is made at block 95 that the password is not correct, then the pager transmits an "illegal password" indication to the GSM/GPRS network 22, as indicated by block 96. The pager then returns to the idle mode designated by box 83.

If a determination is made at block 95 that the password is correct, or if a determination is made at block 94 that the message does not correspond to a protected level, the process proceeds to block 97 where a determination is made as to whether or not the device is enabled. In some cases, it may be undesirable to not enable the pager to be reconfigured by the GSM/GPRS network 22. For example, it may be desirable to allow certain classes of pagers to be reconfigured by the GSM/GPRS network 22 while preventing other classes of pagers from being reconfigured by the GSM/GPRS network 22. The step illustrated in block 97 enables the system of the present invention to distinguish between pagers which can and cannot be reconfigured by the GSM/GPRS network 22.

If a determination is made at block 97 that the pager is enabled to be reconfigured, then the new data is loaded into the memory of the pager, as indicated by block 98, and then the pager transmits a confirmation to the GSM/GPRS network 22, as indicated by block 99. The pager then returns to the idle mode designed by box 83. If a determination is made that the pager is not enabled to be reconfigured by the GSM/GPRS network 22, the pager sends back a "Not Enabled" indication to the GSM/GPRS network 22 and then returns to the idle mode designated by box 83.

If a determination is made at block 93 that the information transmitted to the pager is not data to be used by the pager to reconfigure itself, then the process proceeds to block 102 in FIG. 3B. If the information transmitted to the pager from the GSM/GPRS network 22 is not to be used to reconfigure the pager, then the information corresponds to a message to be displayed to the user. Therefore, an alarm will be used to notify the user that a message has been received, as indicated by block 102. The alarm does not necessarily need to know the data being sent to the pager is to be used by the pager to reconfigure itself because the user does not need to be made aware that the pager is being reconfigured. The alarm can be an audio, video or acoustical alarm, or any other type of notification of which the user can be readily made aware, as will be understood by those skilled in the art. Preferably, the alarm is generated by an acoustical device, as indicated by block 79 in FIG. 2.

In accordance with the present invention, each message transmitted to the pager from the GSM/GPRS network includes one or more steering codes which inform the CPU 52 of the type of message being received. This allows the CPU 52 to determine how the message is to be treated Some messages may include a steering code which indicates that the message must be answered within a predetermined time and in a predetermined manner. In other messages, the steering code may indicate that the message is not time-critical and that it can be responded to at any time and/or that the user is not required to respond at all. Also, the steering code may indicate whether or not the user must respond with a fixed, or preselected, answer which has been previously stored in the memory of the pager. The steering code may also indicate whether or not the user can respond with a variable answer instead of with a fixed, preselected answer, or whether the user can respond with either type of answer.

When a message being transmitted to the pager is time-critical, as in the case of a pager which is utilized by a member of the Fire Department, for example, the steering code transmitted with the message will indicate that the message must be responded to before the pager times out. If a determination is made at block 103 that the message does not include an indication that it must be responded to within a predetermined amount of time, the process proceeds to block 131 in FIG. 3D, which will be described below with respect to FIG. 3D. If a determination is made at block 103 that the steering code indicates that the message is to be responded to within a predetermined amount of time, then the message is displayed on the display of the pager along with a shortcut menu which limits the user to reading the message and transmitting a predefined answering message. The predefined answering message may already have been stored in the pager, or may have been downloaded to the pager. In special cases, some answer texts may also be sent together with the predetermined answering message, as indicated by block 104.

If it is mandatory that the user respond to the message by selecting one of the fixed, preselected answers, then the CPU 52 determines at block 105 that a manual response by button is required. In this case, the user is forced to select one of the fixed, preselected answers from the shortcut menu by pressing a particular button. The CPU 52 or the dispatch station will then determine whether the user reacted before the end of the time-out, as indicated by block 106. If so, then the answer selected by the user was sent to the dispatcher station 13, as indicated by block 108, and the user may erase the displayed message, as indicated by block 109. The pager then returns to the idle mode designated by box 83 in FIG. 3A. If a determination is made at block 106 that the user did not react before the end of the time-out, then the message can no longer be answered, as indicated by block 107, and the pager returns to the idle mode designated by box 83 in FIG. 3A.

Figure 3C:
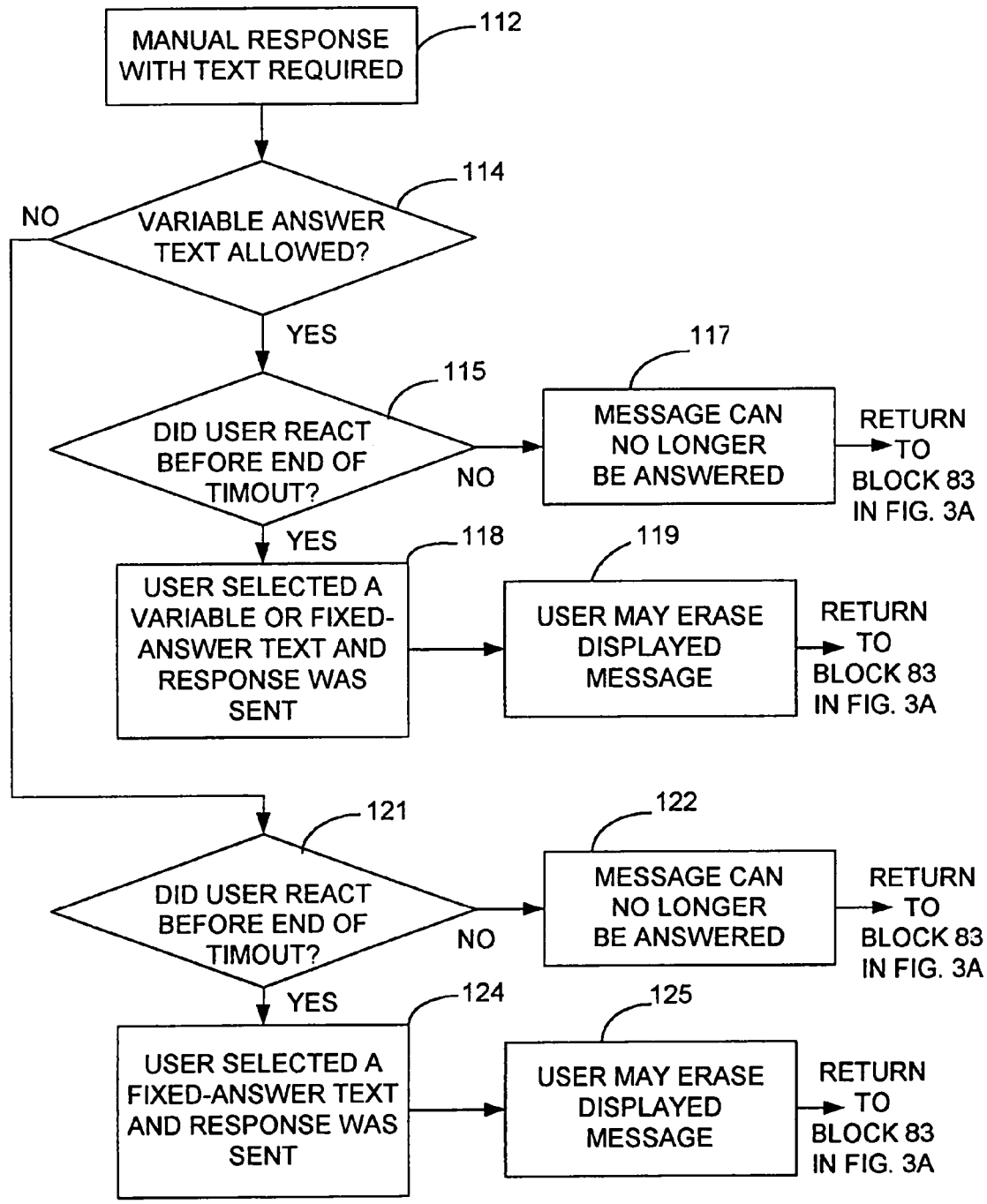

If the steering code included in the message received by the pager indicates that the user does not have to respond by selecting a particular button, i.e., with a preselected answer, as determined at block 105, the process proceeds to block 112 in FIG. 3C. In time-critical situations, if the user is not required to respond by pressing a button, then the user is required to respond manually with a text answer, which can be a variable answer or an answer which is a fixed, preselected answer stored in memory. The steering code will indicate whether or not the answer is to be variable or fixed. If a determination is made at block 114 that the steering code does not allow the user to answer with variable text, then the process proceeds to block 121 where a determination is made as to whether or not the user responded before the end of the time-out. If the steering code does not indicate that the user has the option of responding with variable text, then the user must respond with one of the fixed, preselected answers stored in memory. If a determination is made at block 121 that the user reacted before the end of the time-out, then the preselected answer is transmitted by the pager, as indicated at block 124. The user may then erase the message, as indicated by block 125. The pager then returns to the idle mode designated by box 83 in FIG. 3A.

If a determination is made at block 114 that the steering code will allow the user to answer with a variable-text answer, then a determination is made at block 115 as to whether or not the user reacted before the end of the time-out. If not, the message can no longer be responded to, as indicated by block 117, and the pager returns to the idle mode designated in box 83 in FIG. 3A. If a determination is made at block 115 that the user did respond before the end of the time-out, then the variable or preselected answer text answer generated by the user is transmitted back to the GSM/GPRS network, as indicated by block 118. The user may then erase the message, as indicated by block 119. The pager then returns to the idle mode designated by box 83 in FIG. 3A.

Figure 3D:
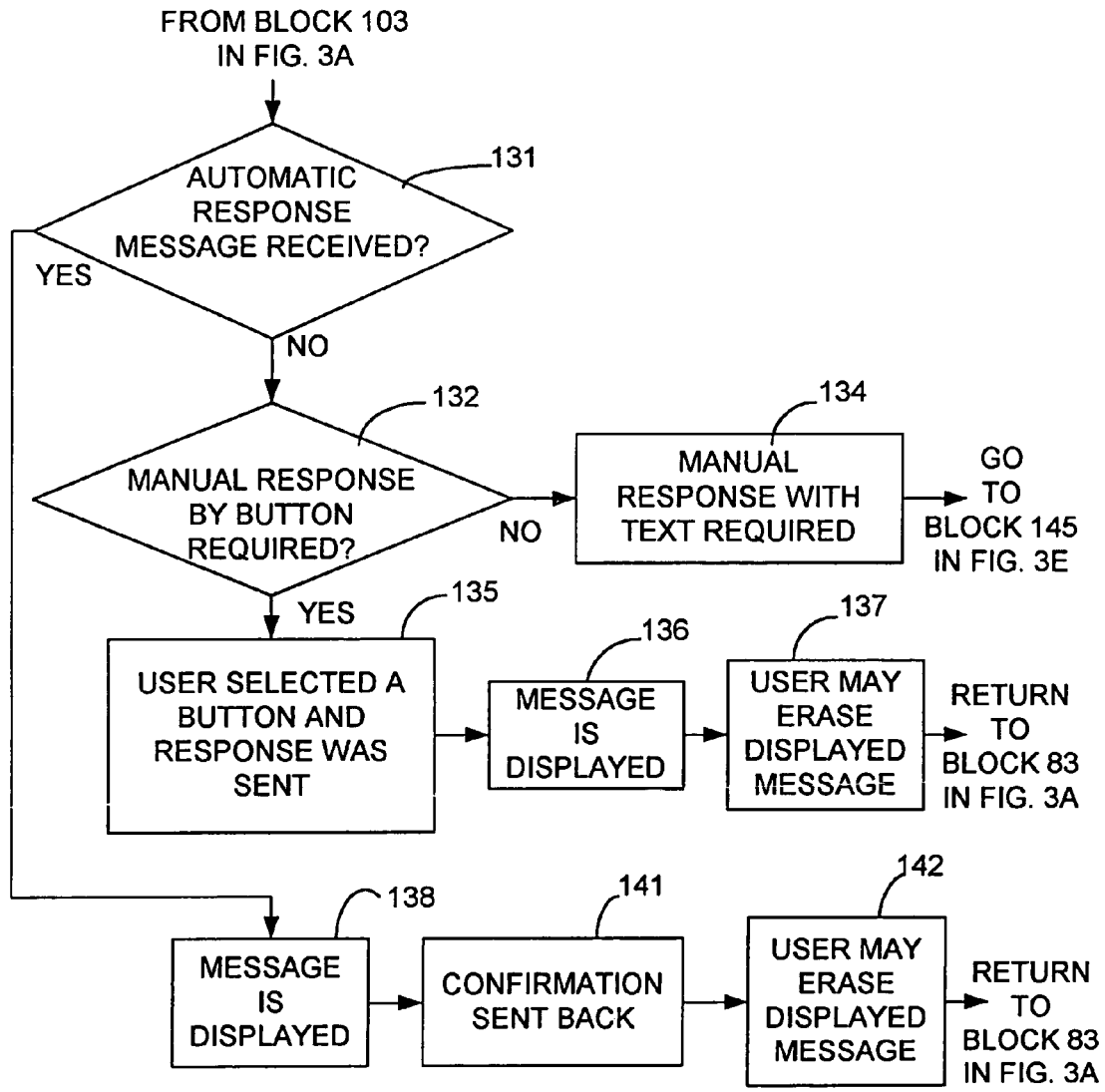
Figure 3E:
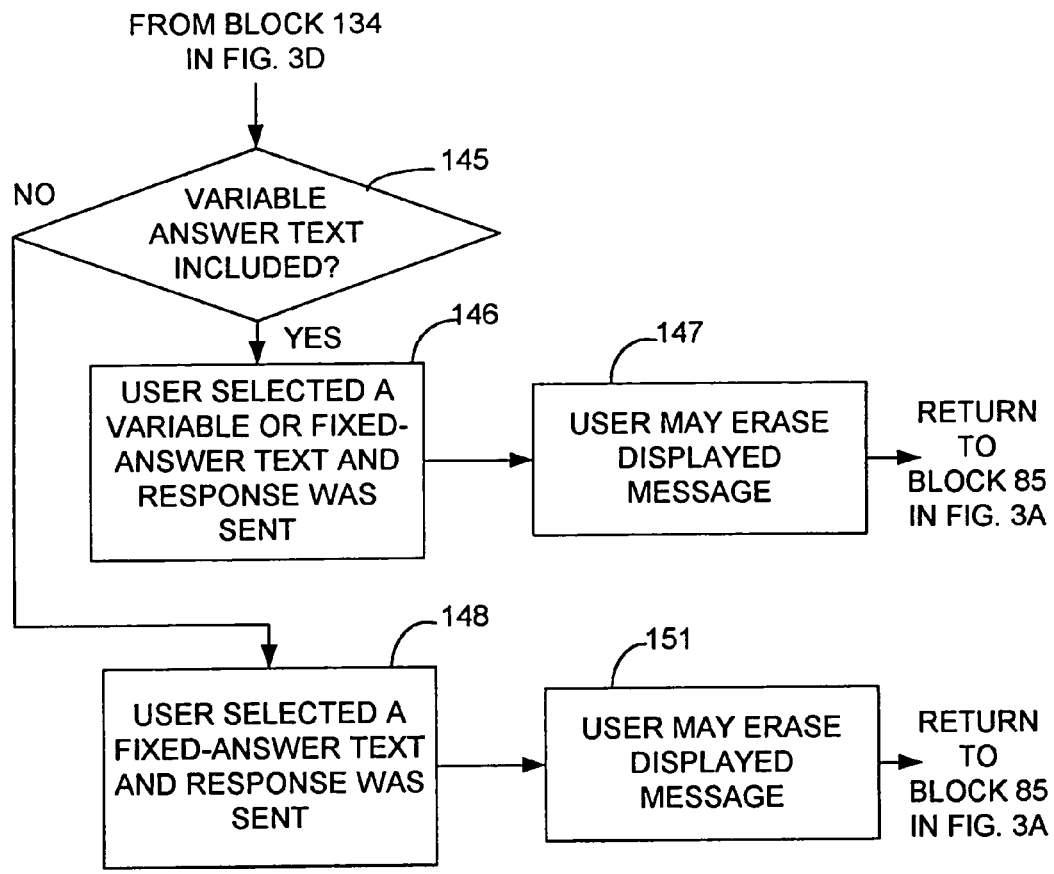

Referring again to FIG. 3B, if the message is not time critical, as determined at block 103, then the process proceeds from block 103 in FIG. 3B to block 131 in FIG. 3D. A determination is then made at block 131 by the CPU 52 as to whether or not the steering code indicates that a pager must respond automatically by sending a confirmation, without any action on the part of the user. In some cases, the dispatcher station 13 is not concerned about whether or not the user has actually read the message, but is concerned that the message was received by the pager. In the later case, the steering code comprised in the message will indicate that an automatic acknowledgment to the message is required. When an automatic acknowledgment is required, the message is displayed on the pager display, as indicated by block 138, and then a confirmation signal is automatically generated by the pager and transmitted to the GSM/GPRS network 22, as indicated by block 141. The user may then erase the displayed message, as indicated by block 142. The pager then returns to the idle mode designated by box 83 in FIG. 3A.

If a determination is made at block 131 that an automatic response by the pager is not required, then a determination is made at block 132 as to whether or not a manual response must be made by the user by pressing a particular button. If the manual response does not need to be made by the user pressing a particular button, then the manual response with text is required, as indicated by block 134. Therefore, the user types in an acknowledgment which is transmitted to the GSM/GPRS network 22 to inform the GSM/GPRS network 22 that the pager received the message. The process then proceeds to block 145 in FIG. 3E, as discussed below in detail.

If a determination is made at block 132 that the response must be made by the pressing of a particular button by the user, when the user presses the correct button, the acknowledgment is sent to the GSM/GPRS network 22 indicating that the user acknowledges receipt of the message, as indicated by block 135. The message is displayed to the user, as indicated by block 136, and the user may then erase the displayed message, as indicated by block 137. The pager then returns to the idle mode designated by box 83 in FIG. 3A.

When a manual response by button is required, the dispatcher station 13 merely wants the user to acknowledge that he or she has received the message, but does not require an answer to the message. If the dispatcher station 13 requires an answer to the message, then the steering code will indicate whether or not the answer can be responded to with a variable text answer, or whether it must be responded to with a fixed, preselected text answer. A determination is made at block 145 as to whether or not the steering code indicates that the user may respond with a variable text answer, or whether the user must respond with a fixed, preselected text answer. If a determination is made at block 145 that the user must respond with a fixed, preselected text answer, then the process proceeds to block 148 where the fixed, preselected text answer selected by the user is transmitted by the pager, as indicated by block 151. The pager then returns to the idle mode designated by box 83 in FIG. 3A.

If a determination is made at block 145 that the user may respond with either a variable text answer, or a fixed, preselected text answer, then when the user generates the answer, the answer is sent, as indicated by block 146. The user may then erase the displayed message, as indicated by block 147. The pager then returns to the idle mode designated by box 83 in FIG. 3A.

It should be noted that all of the steps recited in the flow chart shown in FIGS. 3A–3E are not critical to the present invention. The steps recited are preferable because they allow the user to efficiently communicate with the GSM7GPRS network 22 in a plurality of predetermined manners. It will be understood by those skilled in the art that many of the steps recited in the flow chart of FIGS. 3A–3E are not necessary, but rather, enhance the ability of the dispatcher station 13 to elicit the types of answers it wishes to receive from the user to thereby increase the efficiency of the system. In its broadest form, the present invention provides a two-way pager which communicates over the GSM/GPRS network. The communications protocol utilized by the dispatcher station 13 and by the pager of the present invention may include only some of the steps illustrated in FIGS. 3A–3E. For example, it is not necessary that the steering codes indicate, for example, whether the message must be responded to within a particular time period, whether the user must respond with a fixed, preselected text answer, or whether the pager must automatically acknowledge receipt of the message, as will be understood by those skilled in the art. The flow chart illustrated in FIGS. 3A–3E is intended to provide a detailed demonstration of the preferred embodiment of the communications protocol of the present invention, but is not intended to limit the present invention to these specific steps or series of steps, or the order in which they occur, as will be understood by those skilled in the art.

Enhanced Embodiment of the GSM/GPRS Pager

Figure 4:
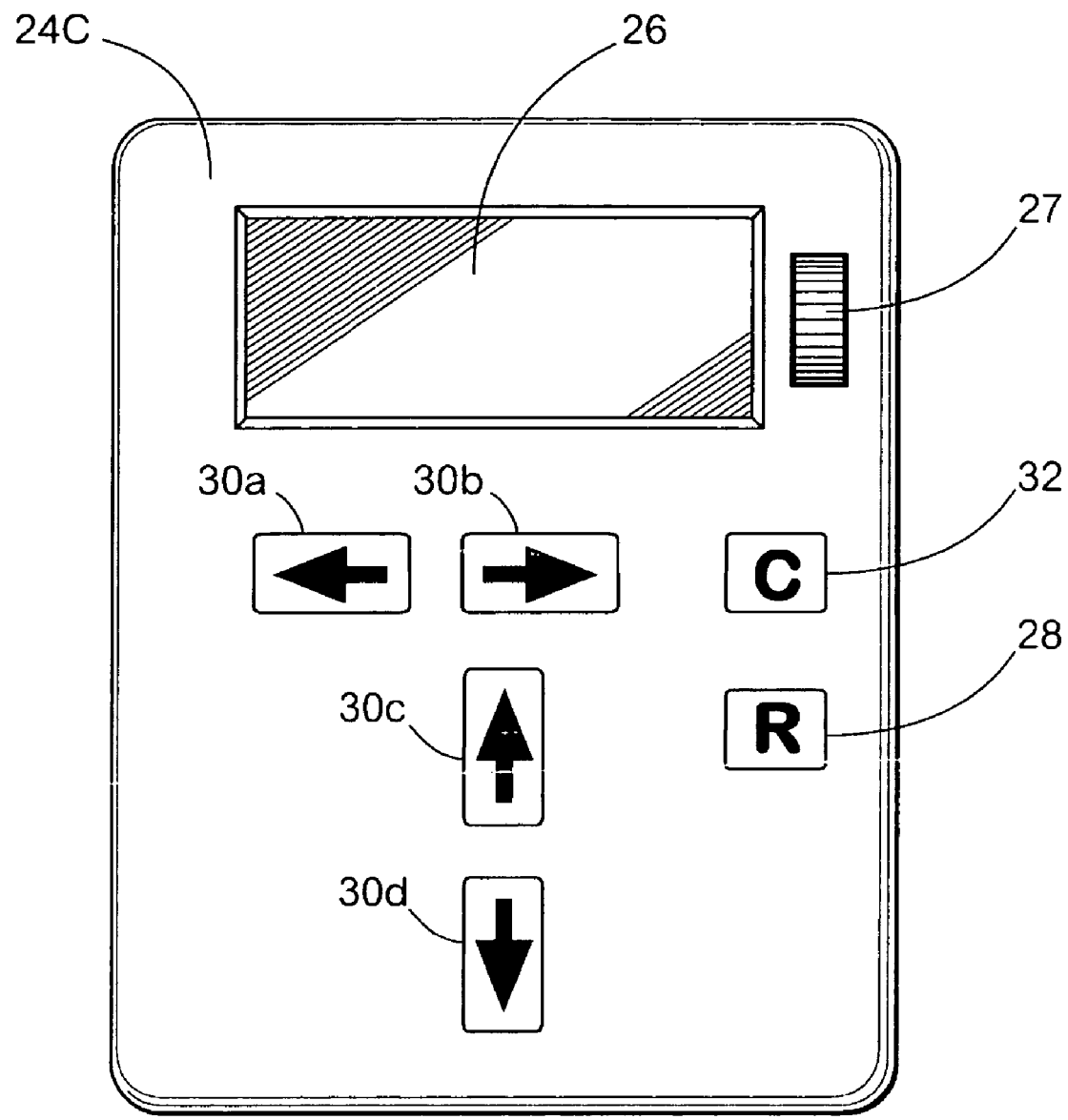
FIG. 4 is a block diagram of a six key pager similar to pager 24A in FIG. 1 that is especially designed to be used in a paging system to direct and control emergency responders in an emergency situation.

A preferred embodiment of the enhanced pager 24C is shown in FIG. 4. The screen 26, preferably an LCD, would give options such as Menu, Setup, Lock Screen, Unlock Screen, etc. The display may have a backlight which can be turned on or off in different lighting conditions. Directional arrow buttons 30c and 30d are for scrolling up and down through the options provided in the display 26. Alternatively, dial 27 can be used to scroll up or down through the options. Directional arrow buttons 30a and 30b are used to scroll side to side through a message. Button 32 is a command or enter button for performing the function that has been selected in the menu. Button 28 is a read acknowledge key. When button 28 is pressed a message is sent to the central system that the message currently displayed has been read. One skilled in the art would know that the buttons are but one implementation of a selection device for a menu. Other non-limiting examples include a scroll dial, a joystick, a roller ball, etc.

Another embodiment of the enhanced pager 24C has only 4 buttons, removing directional arrow buttons 30a and 30b. If a message wrap function is used, it is not necessary to scroll across a message, and buttons 30a and 30b can be eliminated. Likewise, button 28 can also be eliminated in some embodiments so that the pager only has three buttons. A tag, "Read acknowledge" can be placed at the end of a message which does not require a response on button 28. After the message is read, the user scrolls to this tag which appears at the bottom of the message, and presses command button 32. A "read acknowledge" signal is then transmitted to the central system. The pager can be designed so that this message is sent automatically once this tag line is reached in scrolling through the message. However, greater certainty that the message has been read by the user is obtained if the user is required to push a button that he or she has read the message.

One function of the pager is that it can automatically send an acknowledgement when the message is received by the pager. Pressing button 28 acknowledges that the message has been read which is important for the central system to know in many situations, in particular in an emergency situation.

The user of the device is alerted when a message is received from the central system. The alert may comprise one or more embodiments including, but not limited to, a visual signal (e.g. a flashing LED), an auditory signal (e.g. a ring tone or a beep) and a mechanical signal (e.g. a vibration).

The enhanced pager offers a predetermined automatic response upon receipt of a message from the central system. For example, the dispatcher sends a message to many users. Each pager sends an automatic receipt acknowledge signal. Each user can acknowledge that the message was read by pressing button 28. Alternatively, if a response is requested, the user must reply using a predetermined response. The central system can limit the available replies.

As a non-limiting example, in a fire situation in a rural area, the central dispatch service sends the following message to all its part-time firefighters:

"Two alarm fire at 100 Main Street. Can you assist?"

The enhanced pager offers the following responses in a scrollable menu:

"Yes. I'm within 5 minutes."
"Yes. I'm within 15 minutes."
"Yes. But I'm more than 15 minutes away."
"No. I'm pre-engaged."

The enhanced pager may have a security lock out function as well. The pager may be used by someone to receive or transmit sensitive information, such as emergency personnel. In this case, the user may wish to lock the display to keep others from accessing the sensitive information. This embodiment would have menu options "lock" and "unlock." When lock is selected, no messages in memory may be accessed and no messages may be sent out. All other functions may still be operational. To unlock the pager, the "unlock" selection is made and an unlock procedure is performed in sequence to match a sequence that has been saved in the pager or in the central system. The central system can also override the pager by locking the pager under two security levels. A low level security lock would allow the user to unlock the pager. A high level security lock can only be unlocked at the central system level. This can be used in the instance where the lock code has been breached. Additionally, the central system can change the lock code.

Another security function involves a time-out feature for critical messages. When the central system sends a message that is time-critical, it also sends a time period, at the end of which the message will expire. When the pager receives the message, a timer is set for the time period indicated by the central system. If the user has not generated a response before the time period expires, a response to the message is not allowed. This function may also be programmed in the central system. The central system may erase the response options for the particular message after the time period has expired, or delete the entire message from the pager memory. The central system can change the responses available in the pager and erase any message in memory. The functions of the buttons of the user interface may also be reprogrammed by the central system. This control of the pager by the central system allows for adaptability to different situations and for security enhancement which is important in emergency situations.

Yet another function of the pager is to provide text to speech conversion. In some cases, such as in a smoke-filled room, it may not be possible to read the display. In this case, a predetermined sequence of buttons (e.g. pressing button 30a three times in rapid succession) could convert a text message to speech. This function can also be controlled by the central system. A headset input is available in some embodiments to retain privacy if desired.

Yet another function in the pager is a priority display. When the central system sends a message, it can apply a priority level to the message so that the high priority messages appear first in a message list. Non-limiting examples of priority levels include high, medium, and low.

Some additional functions of the pager require no interaction by a user upon receipt of a message. These include an accelerometer function, a low battery function, an out-of-area function, and a location determination function.

An accelerometer device is an instrument that measures acceleration. The accelerometer monitors the movement of the pager or the user using an accelerometer device. It is attached to the surface of the object that will experience acceleration or motion. As the object moves, it causes an electric current to flow, which is measured as it relates to the amount of acceleration or motion that is taking place and indicates that amount on the calibrated accelerometer. The acceleration or motion information is sent to a microprocessor which adjusts the previous location information by the amount reported by the accelerometer. The microprocessor may be a dedicated part of the accelerometer unit, or it may be the microprocessor of the pager. Accelerometers are well-known in the art and can be integrated into the pager, or can be connected by wire or wireless interface such as Bluetooth Technology. If, for instance, the pager is set down on a desk for more than a predetermined amount of time, the pager can be considered as off, or temporarily unmonitored, and an immediate response to a message would not be anticipated. If the immobile time is extended, the pager can be considered as "dead." This could mean that the pager has been physically lost or, in some situations, it could indicate that the user is physically unable to move (i.e. the user is immobilized), or even that the user has expired. In an emergency situation, such as a fire or large police action, it is important for the central system to know the status of its personnel.

A low battery detector can use a voltage supervisor to monitor the battery voltage. A minimum battery level is determinable at which the system will reliably transmit and receive messages. When the battery drains to this minimum operational level, a message is automatically sent to the central dispatch system that this pager has a low battery condition and the system will not expect any further responses to messages until the battery is recharged. Alternatively, the battery voltage of the pager is periodically transmitted to the central system so that the central system has the battery voltage indication. When the transmitted voltage level drops to the minimum voltage level, the central system does not expect an answer from the user. The central system may send a message to the pager admonishing the user to charge the battery. A "low-battery" alert is also emitted by the pager to warn the user. The alert could be visual (a blinking LED for instance), auditory (an audible beep), or mechanical (a short vibration), among other solutions.

After the tragedy at the Twin Towers of the World Trade Center, steps were taken to keep track of the location of cellular phones. When a cellular phone sends out the message, it is usually picked up by three antennae at different locations. Using triangulation algorithms, the geographic location of the cellular phone can be computed by a computer. It is not possible to locate a one-way pager in a similar fashion as the one-way pager does not send out any message. The two-way pager of this invention sends out SMS messages over the GSM/GPRS standard. Thus, the central station can geographically locate the pager in the same way that the cellular phone can be located as they both use a GSM/GPRS network.

In a typical environment, the system antennae are directional with, typically, three directions, but sometimes up to eight or more. Of the antennaes receiving a signal from the pager, one transmits the largest received signal strength indicator to the central system. This antenna becomes the communication channel with the most reliable connection. The other antennae generate data which can then be used to determine the location of the pager.

Thus, the central station can keep track of any pager for which it is responsible and keep track of all pagers in a given geographical area. This permits geofencing of the pagers so that the central station knows the location of all pagers within a certain geographical area. This permits the central station to move people to another area when needed and generally manage the resources at its disposal. The central station can easily determine how many people are in a given area that has been geofenced. The two-way pager of this invention is the first time that a central station could keep track of the location of its personnel equipped with only pagers. This was not possible with one-way pagers. This will allow the central station to move personnel from one area to another as needed.

Because the central station can control the steering code, it can direct that any pager, or all pagers within a certain area, send a signal which permits the central station to determine the location of each pager that it controls.

While this enhanced pager is still basically a pager, it will be apparent that along with its ability to send canned messages, it has some of the characteristics of a cellular phone as in the ability to geographically locate the two-way pager.

This location information can also be used to inform the central system when the pager is taken out of a predetermined area. In this case, an out of area message is sent to the central office. Additionally, a return to area message is sent when the pager is returned.

While this invention has been disclosed in its preferred forms, it will be apparent to those skilled in the art that many modifications, additions, and deletions can be made therein without departing from the spirit and scope of the invention and its equivalents as set forth in the following claims.

Therefore, having thus described the invention, at least the following is claimed:

1. A two-way pager for communicating over a Global System for Mobile Communications (GSMGPRS) network, the pager comprising:
a transceiver for transmitting responses to and receiving messages from the network;
an antenna electrically coupled with the transceiver for radiating and receiving radio frequency waves;
a communication driver which converts a GSM/GPRS message received by the transceiver into a pager message;
a data processor with a memory which processes pager messages and generates pager responses in communication with the communication driver, the responses being converted into a GSM/GPRS format for transmission over the network, said data processor being capable of recognizing all steering codes in a GSM/GPRS message received by the pager and implementing the orders contained in the steering codes recognized by the data processor; and
a user interface for communication with the data processor, the user interface comprising a display for displaying information to the user which is stored in memory of the data processor or is received over the network, and an input device which enables the user to input data into the user interface, said input device being capable of inputting any of six signals selected by the user, with two signals to scroll within a pager message on the display, two signals to scroll between pager messages on the display, one signal to indicate to the network that the user has read a particular pager message on the display, and one signal to respond to the network to a particular pager message on the display as requested by said pager message, said pager being programmed so that said six signals can be used in a set combination to provide security for the pager and for any other function assigned by a pager message or program within the pager, the user interface further having an alert device for providing an alert indication when a message is received by the pager over the network, and a message transreceiving device which automatically sends a response over the network indicating that a message was received by the pager.

2. The pager of claim 1, wherein the pager communicates over the GSM/GPRS network by utilizing a Short Message Service (SMS) of the GSM/GPRS network.

3. The pager of claim 2, wherein at least one of the steering codes indicates that the GSM/GPRS message received by the pager is time-critical, wherein when the pager message corresponding to the GSM/GPRS message is received by the processor, the processor analyzes the pager message to determine whether or not the steering code indicates that the pager message is time-critical, wherein if the processor determines that the pager message is time-critical, the processor sets a timer to expire at the end of a predetermined time-out period and determines when the time-out period has expired, wherein if the user has not generated a response to the pager message via the user interface before the time-out period expires, the processor will not allow a response to the pager message to be transmitted by the pager.

4. The pager of claim 2, wherein if the processor determines that the steering code indicates that the pager message is time-critical, the processor analyzes the steering code to determine whether or not the steering code indicates that the user must respond by actuating a predetermined button on the input device, wherein if the processor determines that the steering code indicates that the user must respond by actuating a predetermined button on the input device, the processor determines whether or not the user actuated the predetermined button before the time-out period expired, wherein if the user actuated the predetermined button on the input device before the time-out period expired, a GSM/GPRS response corresponding to the predetermined button is transmitted by the transceiver.

5. The pager of claim 2, wherein if the processor determines that the steering code does not indicate that the pager message is time-critical, then the processor determines whether or not the steering code indicates that the pager must automatically transmit an acknowledgment GSM/GPRS response indicating that the pager message was received, wherein if the processor determines that the steering code indicates that the pager must respond by automatically transmitting an acknowledgment GSM/GPRS response, the pager transmits an acknowledgment GSM/GPRS response.

6. The pager of claim 2, wherein if the processor determines that the steering code does not indicate that the pager must respond automatically with an acknowledgment GSM/GPRS response, the processor determines whether or not the steering code indicates that the user must manually generate an acknowledgment GSM/GPRS response by manually actuating a predetermined button on the input device, wherein if the processor determines that the steering code does not indicate that the user must manually generate an acknowledgment GSM/GPRS response by manually actuating a predetermined button on the input device, then the processor determines whether or not the steering code indicates that the user must manually generate an acknowledgment GSM/GPRS response by causing one of a plurality of preprogrammed answers stored in the memory device to be read from the memory device and transmitted by the pager, and the pager is ready for the user to transmit such preprogrammed answer.

7. The pager of claim 2, in which an accelerometer is located in at least close proximity to the pager and has a communication link with the pager to transmit information to the pager for communication over the network.

8. The pager of claim 2, which has a low battery detector in communication with the pager to send out a low-battery message over the network when the battery reaches a certain level.

9. The pager of claim 8, in which an accelerometer is located in at least close proximity to the pager and has a communication link with the pager to transmit information to the pager for communication over the network.

10. The pager of claim 2, in which the pager can convert any written message into speech.

11. The two-way pager of claim 1, in which the pager is programmed so that the set combination for security must be entered by the user before a time out period expires.

12. A two-way pager for communicating over a Global System for Mobile Communications (GSM/GPRS) network, the pager comprising:
a transceiver for transmitting responses to and receiving messages from the network;
an antenna electrically coupled with the transceiver for radiating and receiving radio frequency waves;
a communication driver which converts a GSM/GPRS message received by the transceiver into a pager message;
a data processor with a memory which processes pager messages and generates pager responses in communication with the communication driver, the responses being converted into a GSM/GPRS format for transmission over the network, said data processor being capable of recognizing all steering codes in a GSM/GPRS message received by the pager and implementing the orders contained in the steering codes recognized by the data processor; and
a user interface for communication with the data processor, the user interface comprising a display for displaying information to the user which is stored in memory of the data processor or is received over the network, and an input device which enables the user to input data into the user interface, said input device being capable of inputting any of a plurality of signals selected by the user, with two signals to scroll within a pager message on the display, two signals to scroll between pager messages on the display, one signal to indicate to the network that the user has read a particular pager message on the display, and one signal to respond to the network to a particular pager message on the display as requested by said pager message, said pager being programmed so that a set combination of the plurality of signals can be entered by the user before a time out period expires to provide security for the pager and for any other function assigned by a pager message or program within the pager, the user interface further having an alert device for providing an alert indication when a message is received by the pager over the network, said transceiver being capable of automatically sending said indication over the network that a message was received by the pager.

13. The pager of claim 12, wherein the pager communicates over the GSM/GPRS network by utilizing a Short Message Service (SMS) of the GSM/GPRS network.

14. The pager of claim 13, wherein at least one of the steering codes indicates that the GSM/GPRS message received by the pager is time-critical, wherein when the pager message corresponding to the GSM/GPRS message is received by the processor, the processor analyzes the pager message to determine whether or not the steering code indicates that the pager message is time-critical, wherein if the processor determines that the pager message is time-critical, the processor sets a timer to expire at the end of a predetermined time-out period and determines when the time-out period has expired, wherein if the user has not generated a response to the pager message via the user interface before the time-out period expires, the processor will not allow a response to the pager message to be transmitted by the pager.

15. The pager of claim 13, wherein if the processor determines that the steering code does not indicate that the pager message is time-critical, then the processor determines whether or not the steering code indicates that the pager must automatically transmit an acknowledgment GSM/GPRS response indicating that the pager message was received, wherein if the processor determines that the steering code indicates that the pager must respond by automatically transmitting an acknowledgment GSM/GPRS response, the pager transmits an acknowledgment GSM/GPRS response.

16. The apparatus of claim 13, wherein if the processor determines that the steering code does not indicate that the pager must respond automatically with an acknowledgment GSM/GPRS response, the processor determines whether or not the steering code indicates that the user must manually generate an acknowledgment GSM/GPRS response by manually actuating a predetermined button on the input device, wherein if the processor determines that the steering code does not indicate that the user must manually generate an acknowledgment GSM/GPRS response by manually actuating a predetermined button on the input device, then the processor determines whether or not the steering code indicates that the user must manually generate an acknowledgment GSM/GPRS response by causing one of a plurality of preprogrammed answers stored in the memory device to be read from the memory device and transmitted by the pager.

17. A two-way pager for communicating over a Global System for Mobile Communications (GSM/GPRS) network, the pager comprising:
a transceiver for transmitting responses to and receiving messages from the network;
an antenna electrically coupled with the transceiver for radiating and receiving radio frequency waves;
a communication driver which converts a GSM/GPRS message received by the transceiver into a pager message;
a data processor with a memory which processes pager messages and generates pager responses in communication with the communication driver, the responses being converted into a GSM/GPRS format for transmission over the network, said data processor being capable of recognizing all steering codes in a GSM/GPRS message received by the pager and implementing the orders contained in the steering codes recognized by the data processor; and
a user interface for communication with the data processor, the user interface comprising a display for displaying information to the user which is stored in memory of the data processor or is received over the network, and an input device which enables the user to input data into the user interface, said input device being capable of inputting any of a plurality of signals selected by the user, with at least one signal to scroll within a pager message on the display, at least one signal to scroll between pager messages on the display, and one signal to indicate to the network that the user has read a particular pager message on the display, one signal to respond to the network to a particular pager message on the display and as requested by said pager message, said pager being programmed so that a set combination of the plurality of signals can be entered by the user before a time out period expires to provide security for the pager and for any other function assigned by a steering code in a GSM/GPRS message or program within the pager, said user interface further having a signal for the user to indicate over the network that a message has been received by the pager.

18. The pager of claim 17, wherein at least one of the steering codes indicates that the GSM/GPRS message received by the pager is time-critical, wherein when the pager message corresponding to the GSM/GPRS message is received by the processor, the processor analyzes the pager message to determine whether or not the steering code indicates that the pager message is time-critical, wherein if the processor determines that the pager message is time-critical, the processor sets a timer to expire at the end of a predetermined time-out period and determines when the time-out period has expired, wherein if the user has not generated a response to the pager message via the user interface before the time-out period expires, the processor will not allow a response to the pager message to be transmitted by the pager.

19. The pager of claim 17, wherein if the processor determines that the steering code indicates that the pager message is time-critical, the processor analyzes the steering code to determine whether or not the steering code indicates that the user must respond by actuating a predetermined button on the input device, wherein if the processor determines that the steering code indicates that the user must respond by actuating a predetermined button on the input device, the processor determines whether or not the user actuated the predetermined button before the time-out period expired, wherein if the user actuated the predetermined button on the input device before the time-out period expired, a GSM/GPRS response corresponding to the predetermined button is transmitted by the transceiver.

20. The pager of claim 17, wherein if the processor determines that the steering code does not indicate that the pager message is time-critical, then the processor determines whether or not the steering code indicates that the pager must automatically transmit an acknowledgment GSM/GPRS response indicating that the pager message was received, wherein if the processor determines that the steering code indicates that the pager must respond by automatically transmitting an acknowledgment GSM/GPRS response, the pager transmits an acknowledgment GSM/GPRS response.

21. The pager of claim 17, wherein if the processor determines that the steering code does not indicate that the pager must respond automatically with an acknowledgment GSM/GPRS response, the processor determines whether or not the steering code indicates that the user must manually generate an acknowledgment GSM/GPRS response by manually actuating a predetermined button on the input device, wherein if the processor determines that the steering code does not indicate that the user must manually generate an acknowledgment GSM/GPRS response by manually actuating a predetermined button on the input device, then the processor determines whether or not the steering code indicates that the user must manually generate an acknowledgment GSM/GPRS response by causing one of a plurality of preprogrammed answers stored in the memory device to be read from the memory device and transmitted by the pager, and the pager is ready for the user to transmit such preprogrammed answer.

22. A two-way pager for communicating over a Global System for Mobile Communications (GSM/GPRS) network, the pager comprising:
  a transceiver for transmitting responses to and receiving messages from the network;
  an antenna electrically coupled with the transceiver for radiating and receiving radio frequency waves;
  a communication driver which converts a GSM/GPRS message received by the transceiver into a pager message;
  a data processor with a memory which processes pager messages and generates pager responses in communication with the communication driver, the responses being converted into a GSM/GPRS format for transmission over the network said data processor being capable of recognizing all steering codes in a GSM/GPRS message received by the pager and implementing the orders contained in the steering codes recognized by the data processor; and
  a user interface for communication with the data processor, the user interface comprising a display for displaying information to the user which is stored in memory of the data processor or is received over the network, and an input device which enables the user to input data into the user interface, said input device being capable of inputting a plurality of signals selected by the user, with at least one signal to scroll within a pager message on the display, at least one signal to scroll between pager messages in the display, one signal to indicate to the network that the user has read a particular pager message with a tag at the end of the pager message on the display, and to also respond to the network to a particular pager message on the display as requested by said pager message, said pager being programmed so that a set combination of the plurality of signals can be entered by the user before a time out period expires to provide security for the pager and for any other function assigned by a pager message or program within the pager, the user interface further having an alert device for providing an alert indication when a message is received by the pager over the network, with said transceiver being capable of automatically sending a response over the network that a message was received by the pager.

23. The pager of claim 22, wherein the pager communicates over the GSM/GPRS network by utilizing a Short Message Service (SMS) of the GSM/GPRS network.

24. The pager of claim 23, wherein at least one of the steering codes indicates that the GSM/GPRS message received by the pager is time-critical, wherein when the pager message corresponding to the GSM/GPRS message is received by the processor, the processor analyzes the pager message to determine whether or not the steering code indicates that the pager message is time-critical, wherein if the processor determines that the pager message is time-critical, the processor sets a timer to expire at the end of a predetermined time-out period and determines when the time-out period has expired, wherein if the user has not generated a response to the pager message via the user interface before the time-out period expires, the processor will not allow a response to the pager message to be transmitted by the pager.

25. The pager of claim 23, wherein if the processor determines that the steering code indicates that the pager message is time-critical, the processor analyzes the steering code to determine whether or not the steering code indicates that the user must respond by actuating a predetermined button on the input device, wherein if the processor determines that the steering code indicates that the user must respond by actuating a predetermined button on the input device, the processor determines whether or not the user actuated the predetermined button before the time-out period expired, wherein if the user actuated the predetermined button on the input device before the time-out period expired, a GSM/GPRS response corresponding to the predetermined button is transmitted by the transceiver.

26. The pager of claim 23, wherein if the processor determines that the steering code does not indicate that the pager message is time-critical, then the processor determines whether or not the steering code indicates that the pager must automatically transmit an acknowledgment GSM/GPRS response indicating that the pager message was received, wherein if the processor determines that the steering code indicates that the pager must respond by automatically transmitting an acknowledgment GSM/GPRS response, the pager transmits an acknowledgment GSM/GPRS response.

27. The pager of claim 23, wherein if the processor determines that the steering code does not indicate that the pager must respond automatically with an acknowledgment GSM/GPRS response, the processor determines whether or not the steering code indicates that the user must manually generate an acknowledgment GSM/GPRS response by manually actuating a predetermined button on the input device, wherein if the processor determines that the steering code does not indicate that the user must manually generate an acknowledgment GSMIGPRS response by manually actuating a predetermined button on the input device, then the processor determines whether or not the steering code indicates that the user must manually generate an acknowledgment GSM/GPRS response by causing one of a plurality of preprogrammed answers stored in the memory device to be read from the memory device and transmitted by the pager, and the pager is ready for the user to transmit such preprogrammed answer.

28. A method for a pager user to utilize a two-way pager to communicate over the Global System for Mobile Communications (GSM/GPRS) network, the method comprising the steps of:
  transmitting GSM/GPRS responses from the pager to the GSM/GPRS network;
  receiving GSM/GPRS messages in the pager transmitted from the GSM/GPRS network;
  converting the GSM/GPRS messages which are formatted in accordance with a GSM/GPRS standard into pager messages; and
  processing the pager messages and generating pager responses to the pager messages, the pager responses being converted by the processor into GSM/GPRS responses formatted in accordance with the GSM/GPRS standard and transmitted by the pager over the GSM/GPRS network; and
  wherein each GSM/GPRS message received by the pager includes one or more steering codes, said steering code of the message conveying an order to the pager that a reply to the message must include a response from the pager user, and said processor is further operable to recognize the steering code and to force the reply to the message to include a response that is permitted by the steering code.

29. The method of claim 28, which further includes automatically generating and sending a message over the network that a message was received by the pager.

30. The method of claim 28, wherein the pager communicates over the GSM/GPRS network by utilizing a Short Message Service (SMS) of the GSM/GPRS network.

31. The method of claim 28, wherein at least one of the steering codes indicates that the GSM/GPRS message received by the pager is time-critical, wherein when the pager message corresponding to the GSM/GPRS message is received by the processor, the processor analyzes the pager message to determine whether or not the steering code indicates that the pager message is time-critical, wherein if the processor determines that the pager message is time-critical, the processor sets a timer to expire at the end of a predetermined time-out period and determines when the time-out period has expired, wherein if the user has not generated a response to the pager message via the user interface before the time-out period expires, the processor will not allow a response to the pager message to be transmitted by the pager.

32. The method of claim 28, in which the steering code only permits a reply to a message from a specified menu of permissible replies.

33. The method of claim 28, in which the steering code can be programmed from a central location to perform the function of shutting off the pager, erasing the memory, or prohibiting the pager from sending any messages over the network.

34. The method of claim 28, in which the pager has means to determine the extent of movement by the pager, with the pager being programmed to send a message indicating its immobility over the network when it has not moved within a certain period of time.

35. The method of claim 28, in which a steering code can be utilized to change the list of permissible replies by the pager.

* * * * *